(12) United States Patent
Nakayama et al.

(10) Patent No.: US 11,134,548 B2
(45) Date of Patent: Sep. 28, 2021

(54) DRIVING DEVICE

(71) Applicant: Rohm Co., Ltd., Kyoto (JP)

(72) Inventors: Masaaki Nakayama, Kyoto (JP); Vishwajit Babasaheb Bugade, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/021,522

(22) Filed: Sep. 15, 2020

(65) Prior Publication Data

US 2021/0274610 A1   Sep. 2, 2021

(30) Foreign Application Priority Data

Mar. 2, 2020 (JP) .............................. JP2020034643

(51) Int. Cl.
*H05B 45/10* (2020.01)
*H05B 45/34* (2020.01)
*H05B 47/14* (2020.01)
*B60Q 1/46* (2006.01)

(52) U.S. Cl.
CPC .............. *H05B 45/10* (2020.01); *B60Q 1/46* (2013.01); *H05B 45/34* (2020.01); *H05B 47/14* (2020.01)

(58) Field of Classification Search
CPC ........ H05B 45/10; H05B 45/34; H05B 47/14; B60Q 1/46
See application file for complete search history.

(56) References Cited

U.S. PATENT DOCUMENTS

| 7,348,766 | B2* | 3/2008 | Hachiya | ............... | B23K 9/1056 |
| | | | | | 323/284 |
| 8,754,590 | B2* | 6/2014 | Makino | .................. | H05B 45/37 |
| | | | | | 315/307 |
| 2008/0018267 | A1* | 1/2008 | Arakawa | ................ | H05B 45/10 |
| | | | | | 315/301 |
| 2018/0254379 | A1* | 9/2018 | Nakayama | ........... | H05B 45/325 |

FOREIGN PATENT DOCUMENTS

JP   2019-169655   10/2019

* cited by examiner

*Primary Examiner* — Daniel D Chang
(74) *Attorney, Agent, or Firm* — Fish & Richardson P.C.

(57) ABSTRACT

A driving device includes, for example: an output terminal; a transistor configured to generate an output current to the output terminal; a logic circuit configured to perform on/off control of the transistor at a predetermined period; and a current sense circuit configured to sense the output current. The current sense circuit is configured to be enabled during an on-period of the transistor. The logic circuit is configured to suspend the on/off control and reset the period when the output current becomes lower than a first threshold value during the on-period.

10 Claims, 10 Drawing Sheets

DRIVING DEVICE

This application is based on Japanese Patent Application No 2020-034643 filed on Mar. 2, 2020, the contents of which are hereby incorporated by reference.

BACKGROUND OF THE INVENTION

1. Field of the Invention

The invention disclosed herein relates to driving devices.

2. Description of Related Art

Conventionally, driving devices for driving a load such as a light-emitting element (e.g., such as LED (light-emitting diode) driver ICs for motorcycles) are used in a variety of applications.

An example of conventional technology related to what is mentioned above is seen in Japanese unexamined patent application publication No. 2019-169655 by the present applicant.

Some conventional driving devices have a function of driving, intermittently at a predetermined period, an output current that is supplied to a load (e.g., a function of blinking flasher lamps on a motorcycle).

Inconveniently, with the above-mentioned conventional driving devices, operating a switch that is externally connected to them (e.g., turning a flasher switch for right or left) may make the supply period of the output current (e.g., the initial lighting period of an LED flasher lamp) indefinite.

SUMMARY OF THE INVENTION

In view of the above-mentioned problem encountered by the present inventors, an object of the invention disclosed herein is to provide a driving device that can properly drive an output current intermittently.

According to one aspect of what is disclosed herein, a driving dev ice includes: an output terminal; a transistor configured to generate an output current to the output terminal; a logic circuit configured to perform on/off control of the transistor at a predetermined period, and a current sense circuit configured to sense the output current. The current sense circuit is configured to be enabled during an on-period of the transistor. The logic circuit is configured to suspend the on/off control and reset the period when the output current becomes lower than a first threshold value during the on-period.

Other features, elements, steps, benefits, and characteristics of the present invention will become clear from the following description of preferred embodiments taken m conjunction with the accompanying drawings.

DETAILED DESCRIPTION OF PREFERRED EMBODIMENTS

Light Emission System

Figure 1:
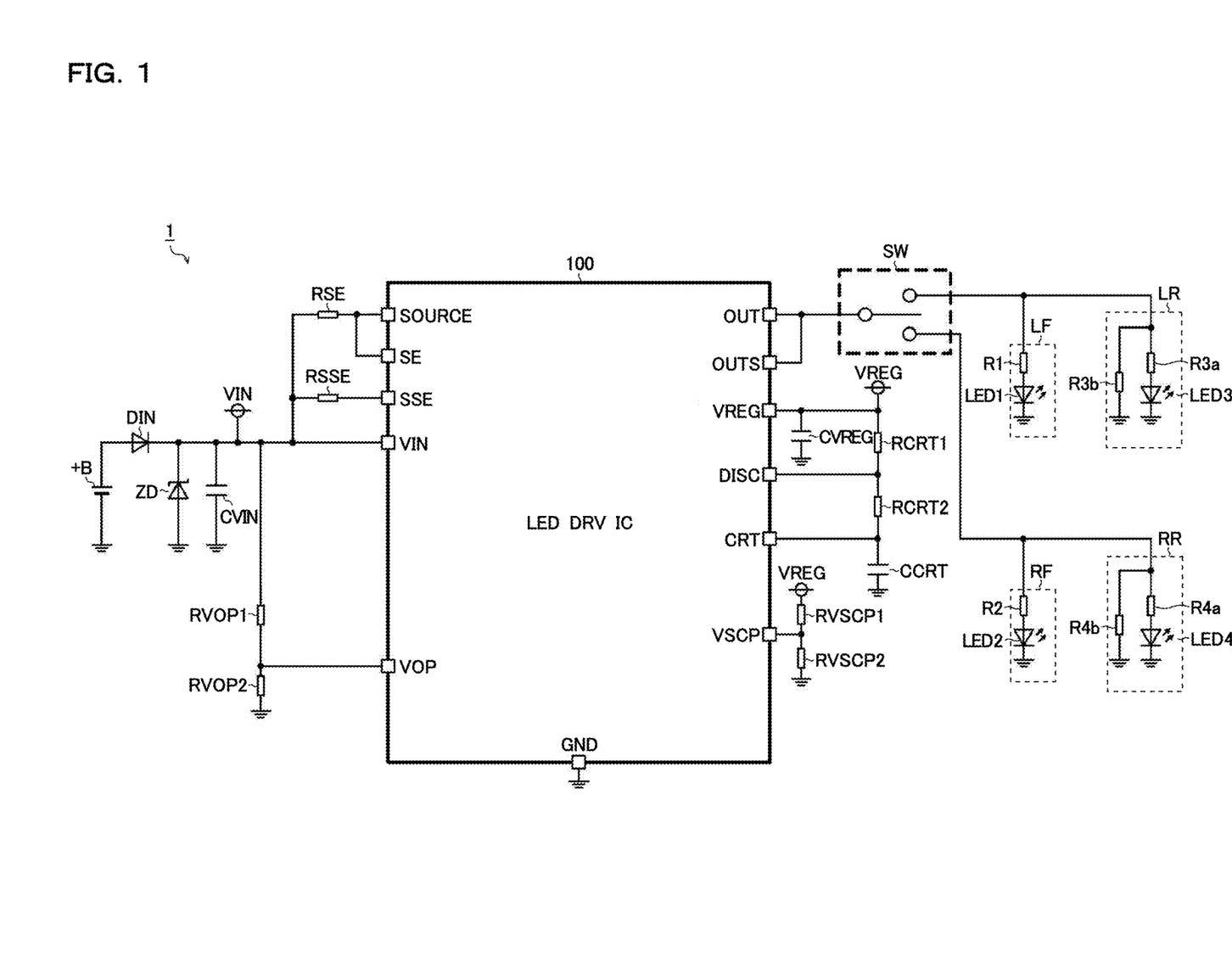
FIG. 1 is a diagram showing an overall configuration of a fight emission system.

FIG. 1 is a diagram, showing an overall configuration of a light emission system provided with a light-emitting element driving device. The light emission system 1 of this configuration example is for mounting on a motorcycle (or any other type of vehicle) as a means for controlling the blinking of flasher lamps (turn indicator lights or turn signals, also called winker lamps in Japan) The light emission system 1 includes a light-emitting element driving device 100 and various discrete components which are externally connected to it.

The discrete components include left flasher lamps LF and LR (front and rear), right flasher lamps RF and RR (front and rear), a flasher switch SW, a plurality of resistors (RCRT1, RCRT2, RSE, RSSE, RVOP1, RVOP2, RVSCP1, and RVSCP2), a plurality of capacitors (CCRT, CVIN, and CVREG), a diode DIN, and a Zener diode ZD.

The light-emitting element driving device 100 is a semiconductor integrated circuit device (what is generally called an LED driver IC) that receives an input voltage VIN (e g. 6 to 18 V) from a battery +B and outputs an output current IOUT (e.g., 1.5 A at the maximum) and thereby controls the blinking of the left flasher lamps LF and LR and the right flasher lamps RF and RR.

As a means for establishing electrical connection with outside the device, the light-emitting element driving device 100 includes a plurality of external terminals (a SOURCE pin, an SE pin, an SSE pin, a VIN pin, a VOP pin, an OUT pin, an OUTS pin, a VREG pin, a DISC pin, a CRT pin, and a VSCP pin). Needless to say, the light-emitting element driving device 100 can have any external terminals other than those just mentioned.

The external connection of the light-emitting element driving device 100 will now be described. The positive pole terminal of the battery +B is connected to the anode of the diode DIN. The respective cathodes of the diode DIN and the Zener diode ZD, the first terminal of the capacitor CVIN, and the respective first terminals of the resistors RSE, RSSE, and RVOP1 are all connected to the VIN pin (i.e., an application terminal for the input voltage VIN). The second terminal of the resistor RSE is connected to the SOURCE pin and the SE pin. The second terminal of the resistor RSSE is connected to the SSE pin. The second terminal of the resistor RVOP1 and the first terminal of the resistor RVOP2 are both connected to the VOP pin. The negative pole terminal of the battery +B, the anode of the Zener diode ZD, the respective second terminals of the capacitor CVIN and the resistor RVOP2, and a GND pin are all connected to a grounded terminal.

The input terminal of the flasher switch SW is connected to the OUT pin and to the OUTS pin. The first output terminal of the flasher switch SW is connected to each of the left flasher lamps LF and LR. The second output terminal of the flasher switch SW is connected to each of the right flasher lamps RF and RR. For structural reasons, the flasher switch SW often has a conduction path across which an oil-leak current passes.

The left flasher lamp LF includes a resistor R1 and a light-emitting diode LED1. The first terminal of the resistor R1 is connected to the first output terminal of the flasher switch SW. The second terminal of the resistor R1 is connected to the anode of the light-emitting diode LED1. The cathode of the light-emitting diode LED1 is connected to the grounded terminal.

The right flasher lamp RF includes a resistor R2 and a light-emitting diode LED2. The first terminal of the resistor R2 is connected to tire second output terminal of the flasher switch SW. The second terminal of the resistor R2 is connected to the anode of the light-emitting diode LED2. The cathode of the light-emitting diode LED2 is connected to the grounded terminal.

The left flasher lamp LR includes resistors R3$a$ and R3$b$ and a light-emitting diode LED3 The respective first terminals of the resistors R3$a$ and R3$b$ are both connected to the first output terminal of the flasher switch SW The second terminal of the resistor R3$a$ is connected to the anode of the light-emitting diode LED3. The second terminal of the resistor R3$b$ and the cathode of the light-emitting diode LED3 are both connected to the grounded terminal.

The right flasher lamp RR includes resistors R4$a$ and R4$b$ and a light-emitting diode LED4. The respective first terminals of the resistors R4$a$ and R4$b$ are both connected to the second output terminal of the flasher switch SW. The second terminal of the resistor R4$a$ is connected to the anode of the light-emitting diode LED4. The second terminal of the resistor R4$b$ and the cathode of the light-emitting diode LED4 are both connected to tire grounded terminal.

The respective first terminals of the resistors RCRT1 and RVSCP1 and the first terminal of the capacitor CVREG are connected to the VREG pin (that is, an application terminal for a constant voltage VREG). The second terminal of tire resistor RCRT1 and the first terminal of the resistor RCRT2 fire connected to the DISC pin. The second terminal of the resistor RCRT2 and the first terminal of the capacitor CCRT are connected to the CRT pin. The second terminal of the resistor RVSCP1 and the first terminal of the resistor RVSCP2 are connected to the VSCP pin. The respective second terminals of the capacitors CVREG and the capacitor CCRT and the second terminal of the resistor RVSCP2 are connected to the grounded terminal.

As described above, the light emission system 1 of this configuration example includes a light-emitting element driving device 100, and a flasher switch SW and at least one light-emitting element (in FIG. 1, four light-emitting diodes LED1 to LED4) that are connected in series to the OUT pin of the light-emitting element driving device 100.

The flasher switch SW is provided, for example, near the handlebars (or steering wheel) of the vehicle, and accepts operations by the driver for specifying the traveling direction of the vehicle (operations for switching among a left blinking state, a right blinking state, and an off state).

More specifically, the flasher switch SW cart take one of the following three states: a first state (left blinking state) in which the flasher switch SW keeps the path between the OUT pin and the left flasher lamps LF and LR conducting and keeps the path between the OUT pin and the right flasher lamps RF and RR cut off; a second state (right blinking state) in which the flasher switch SW keeps the path between the OUT pin and the right flasher lamps RF and RR conducting and keeps the path between the OUT pin and the left flasher lamps LF and LR cut off; and a third state (off state) in which the flasher switch SW keeps both the path between the OUT pin and the left flasher lamps LF and LR and the path between the OUT pin and the right flasher lamps RF and RR cut off.

Switching from the first state (left blinking state) to the second state fright blinking state) and switching from the second state (right blinking state) to the first state (left blinking state) proceed by going through the third state (off state) in the course Terminal Arrangement (20 Pins)

Figure 2:
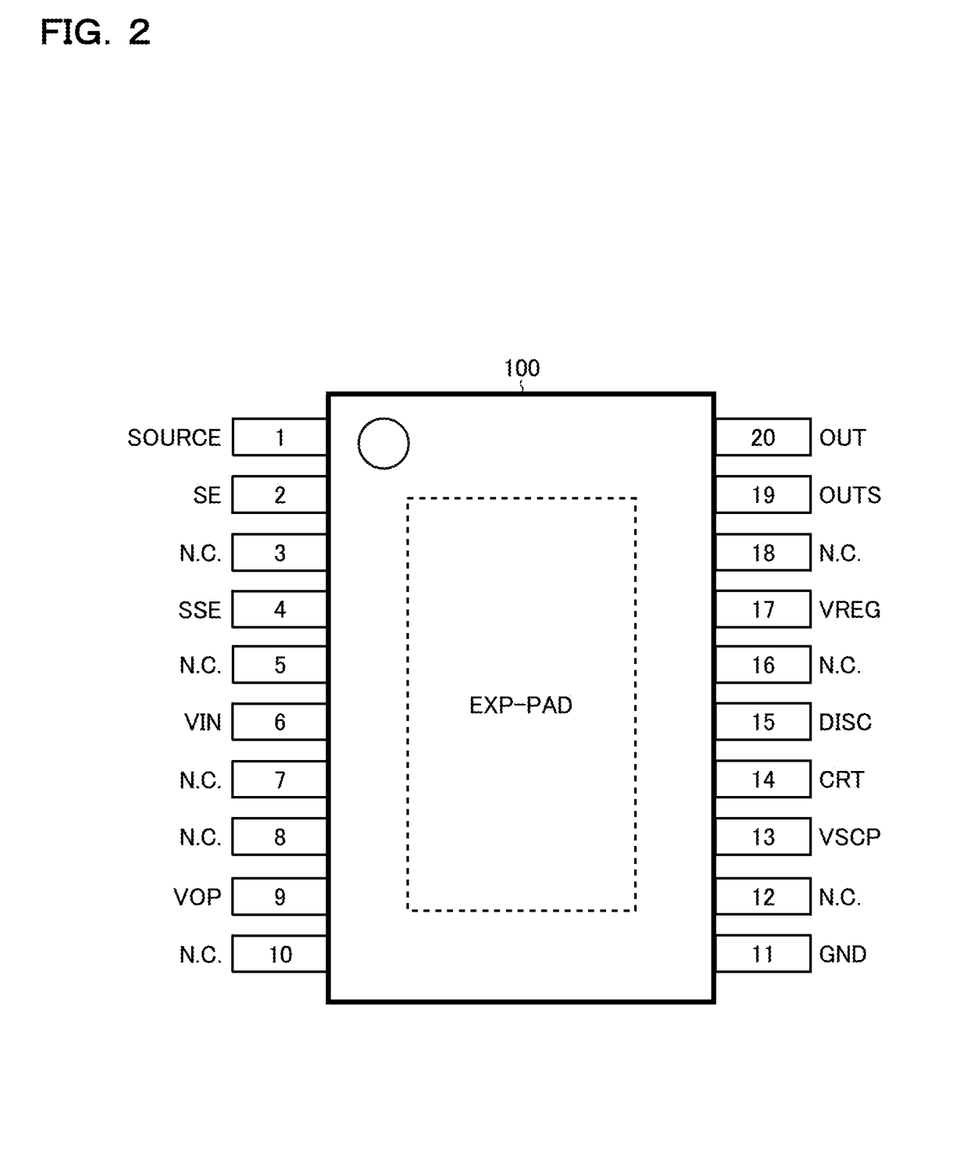
FIG. 2 is a diagram showing a terminal arrangement of a light-emitting element driving device.

FIG. 2 is a top view showing the terminal arrangement (20 pins) of the light-emitting element driving device 100. The light-emitting element driving device 100 shown there has, as its package, a 20-pin HTSSOP (heat-sink thin shrink small outline package). This package has a total of 20 pins laid out of it in two directions (in the left and right directions on the plane of the diagram), ten pins from each of two opposite sides.

The SOURCE pin (pin-1) is a power input terminal. The SE pin (pin-2) is an output current sense input terminal. The SSE pin (pin-4) is a blinking L mode output current sense input terminal. The VIN pin (pin-6) is a power terminal. The VOP pin (pin-9) is an open detection threshold value setting terminal. The GND pin (pin-11) is a ground terminal. The VSCP pin (pin-13) is a short circuit detection threshold value setting terminal. The CRT pin (pin-14) and the DISC pin (pin-15) are both CR timer setting terminals. The VREG pin (pin-17) is a constant voltage terminal. The OUTS pin (pin-19; is a sense output terminal. The OUT pin (pin-20) is a power output terminal. An EXP-PAD terminal, which is indicated by a broken line, is provided on the bottom surface of the package, and functions as both a ground terminal and a heatsink pad.

The pins (pin-3, pin-5, pin-7, pin-8, pin-10, pin-12, pin-16, and pin-18) other than those mentioned above are all non-connected (N.C.) terminals. These pins can be assigned desired functions when, for example, a function is added to the light-emitting element driving device 100.

Light-Emitting Element Driving Device

Figure 3:
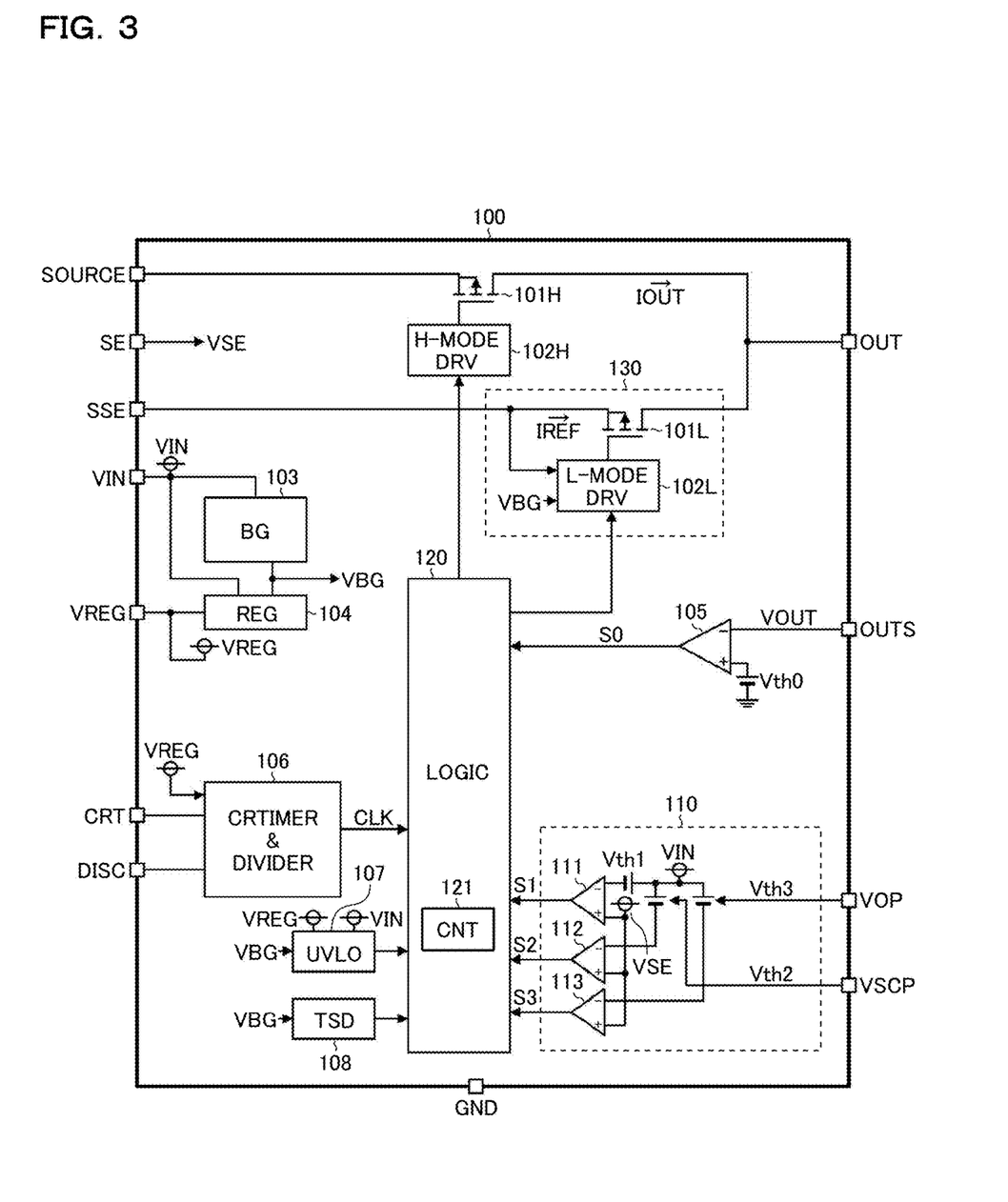
FIG. 3 is a diagram showing an internal configuration of a light-emitting element driving device.

FIG. 3 is a diagram showing the internal configuration of the light-emitting element driving device 100. The light-emitting element driving device 100 of this configuration example includes, in a form integrated together, for example, P-channel MOS (metal-oxide-semiconductor) field-effect transistors 101H and 101L, drivers 102H and 102L, a reference voltage source 103, a regulator 104, a voltage sense circuit 105, a CR timer 106, an undervoltage protection circuit 107, a temperature protection circuit 108, a current sense circuit 110, and a logic circuit 120. Needless to say, the light-emitting element driving device 100 can include any circuits other than those just mentioned.

The source of the transistor 101H is connected to the SOURCE pin. The source of the transistor 101L is connected to the SSE pin. The respective drains of the transistors 101H and 101L are both connected to the OUT pin. The gate of the transistor 101H is connected to the output terminal of the driver 10211. The gate of the transistor 101L is connected to the output terminal of the driver 102L.

In response to instructions from the logic circuit 120, the driver 102H drives the transistor 101H to turn on and off so as to conduct and cut off the output current IOUT to the OUT pin at a predetermined blinking period T (=Ton+Toff) (details will be given later). During the on-period Ton of the transistor 101H, the path between the SOURCE pin and the OUT pin is kept conducting. Accordingly, the output current IOUT can pass through the transistor 101H. On the other hand, during the off-period Toff of the transistor 101H, the path between the SOURCE pin and the OUT pin is kept cut off. Accordingly, the output current IOUT does not pass through the transistor 101H.

In response to instructions from the logic circuit 120, the driver 102L controls the gate voltage of the transistor 101L linearly so as to generate a constant current IREF (where IREF<IOUT) to the OUT pin (details will be given later).

Thus, the transistor 101L and the driver 102L can be understood as a circuit element of a constant current source 130 that generates the constant current IREF. The target value of the constant current IREF can be set, for example, by use of a reference voltage VBG. The constant current source 130 is enabled during the off-period Toff of the transistor 101H (including the period in which on/off control is being suspended).

The reference voltage source 103 generates a predetermined reference voltage VBG from the input voltage VIN. Suitably usable as the reference voltage source 103 is, for example, a band-gap power source, which is comparatively low in both input voltage dependence and temperature dependence.

The regulator 104 generates a predetermined constant voltage VREG (e.g., 5V) from the input voltage VIN to feed it to the VREG pin. The constant voltage VREG is, for example, supplied as an internal supply voltage within tire light-emitting element driving device 100 to different parts of it. To the VREG pin, a capacitor CVREG (for example, 1 to 10 μF) for phase compensation needs to be externally connected. Suitable as the regulator 104 is, for example, an LDO (low drop-out; regulator. The target value of the constant voltage VREG can be set, for example, by use of the reference voltage VBG.

The voltage sense circuit 105 senses the output voltage VOUT that appears at the OUTS pin (which is equivalent to the OUT pin), and conveys the sensing result to the logic circuit 120. Like the constant current source 130 described previously, the voltage sense circuit 105 is enabled during the off-period Toff of the transistor 101H (including the period in which on/off control is being suspended). Usable as the voltage sense circuit 105 is, for example, a comparator that generates a comparison signal S0 by comparing the output voltage VOUT, which is fed to the inverting input terminal (−) of the comparator, with a threshold voltage Vth0, which is fed to the non-inverting terminal (+) of the comparator. In that case, the comparison signal S0 is at low level when VOUT>Vth0, and is at high level when VOUT<Vth0. The operation of the logic circuit 120 based on the comparison signal S0 will be described in detail later.

The CR timer 106 generates an internal clock signal CLK for controlling the blinking of the flasher lamps, and feeds it to the logic circuit 120. The oscillation frequency of the internal clock signal CLK (and hence the blinking period T (=1/Fig.) of the flasher lamps) and the on-duty Don (=Ton/T) of the internal clock signal CLK can be set by use of the discrete components (the resistors RCRT1 and RCRT2 and the capacitor CCRT) that are externally connected to the CRT pin and the DISC pin. The CR timer 106 can be provided with a frequency division function.

The undervoltage protection circuit 107 (what is generally called an undervoltage lock-out circuit) monitors the input voltage VIN and the constant voltage VREG, and conveys the monitoring results to the logic circuit 120. For example, when the input voltage VIN becomes higher than a UVLO deactivation value (e.g., 5 V), the undervoltage protection circuit 107 stops UVLO operation, and when the input voltage VIN becomes lower than a UVLO activation value (e.g., 4.5 V), the undervoltage protection circuit 107 starts UVLO operation. Also, for example, when the constant voltage VREG becomes higher than a UVLO deactivation value (e.g., 3.5 V), the undervoltage protection circuit 107 stops UVLO operation, and when the constant voltage VREG becomes lower than a UVLO activation value (e.g., 2.0 V), the undervoltage protection circuit 107 starts UVLO operation. When UVLO operation starts, all circuit blocks except the regulator 104 are shut down. The UVLO deactivation values and the UVLO activation values can be set, for example, by use of the reference voltage VBG.

The temperature protection circuit 108 (what is generally called a TSD (thermal shut-down) circuit) monitors the chip temperature (junction temperature) of the light-emitting element driving device 100, and conveys the monitoring results to the logic circuit 120. For example, when the chip temperature becomes higher than an abnormality detection value (e.g., 125° C.), tire temperature protection circuit 108 starts TSD operation. The abnormality detection value can be set, for example, by use of the reference voltage VBG The current sense circuit 110 is enabled during the on-period Ton of the transistor 101H. The current sense circuit 110 senses a sense voltage VSE (=VIN−IOUT×RSE) that appears at the SE pin, and conveys the sensing result to the logic circuit 120. The current sense circuit 110 of this configuration example includes three comparators 111 to 113.

The comparator 111 is an open detection comparator for the flasher switch SW. The comparator 111 generates a comparison signal S1 by comparing a threshold voltage (VIN−Vth1, where, e.g., Vth1=50 mV), which is fed to the inverting input terminal (−) of the comparator 111, with the sense voltage VSE, which is ted to the non-inverting terminal (% of the comparator 111. Accordingly, the comparison signal S1 is at high level (i.e., the logic level indicating an SW open being detected) when IOUT<Ith1 (=Vth1/RSE), and is at low level (i.e., the logic level indicating, no SW open being detected) when IOUT>Ith1. The operation of the logic circuit 120 based on the comparison signal S1 will be described in detail later.

The comparator 112 is an LED short-circuit detection comparator for the flasher lamps. The comparator 112 generates a comparison signal S2 by comparing a threshold voltage (VIN−Vth2, where, e.g., Vth2=1.0 to 1.2V), which is fed to the inverting input terminal (−) of the comparator 112, with the sense voltage VSE, which is fed to the non-inverting terminal (+) of the comparator 112. Accordingly, the comparison signal S2 is at high level (i.e., the logic level indicating no LED short circuit being detected) when IOUT<Ith2 (=Vth2/RSE), and is at low level (i.e., the logic level indicating an LED short circuit being detected) when IOUT>Ith2.

On detecting an LED short circuit, the logic circuit 120 forcibly turns off the transistor 101H. It is thus possible to prevent heating and destruction due to an overcurrent, and thereby to give the light-emitting element driving device 100 higher reliability. The threshold voltage Vth2 can be set by use of the resistors RVSCP1 and RVSCP2 that are externally connected to the VSCP pin.

The comparator 113 is an LED open detection comparator for the flasher lamps. The comparator 113 generates a comparison voltage S3 by comparing a threshold voltage (VIN−Vth3, where, e.g., Vth3>100 mV), which is fed to the inverting input terminal (−) of the comparator 113, with the sense voltage VSE, which is fed to the non-inverting terminal (+) of the comparator 113. Accordingly, the comparison voltage S3 is at high level (i.e., tire logic level indicating an LED open being detected) when IOUT<Ith3 (=Vth3/RSE), and is at low level (i.e., the logic level indicating no LED open being detected) when IOUT>Ith3.

On detecting an LED open, the logic circuit 120 shortens the blinking period T (e.g., to one half of that in normal condition). For example, when an open fault occurs in one of the left flasher lamps LF and LR (or the right flasher lamps RE and RR), the other blinks at twice the speed in normal condition. It is thus possible to inform the driver of a fault in the flasher lamps with no need for a separate alerting means, and thereby to give the light-emitting element driving device 100 higher reliability. The threshold voltage Vth3 can be set by use of the resistors RVOP1 and RVOP2 that are externally connected to the VOP pin.

The logic circuit 120 is the principal agent that comprehensively control the overall operation of the light-emitting element driving device 100, and includes a counter 121 that counts the number of pulses in the internal clock signal CLK For example, during the on/off control of the transistor 101H, the logic circuit 120 counts the on-period Ton and the off-period Toll of the transistor 101H (and hence the blinking period T=Ton+Toff) based on the count value from the counter 121.

Basic Operation Modes

Figure 4:
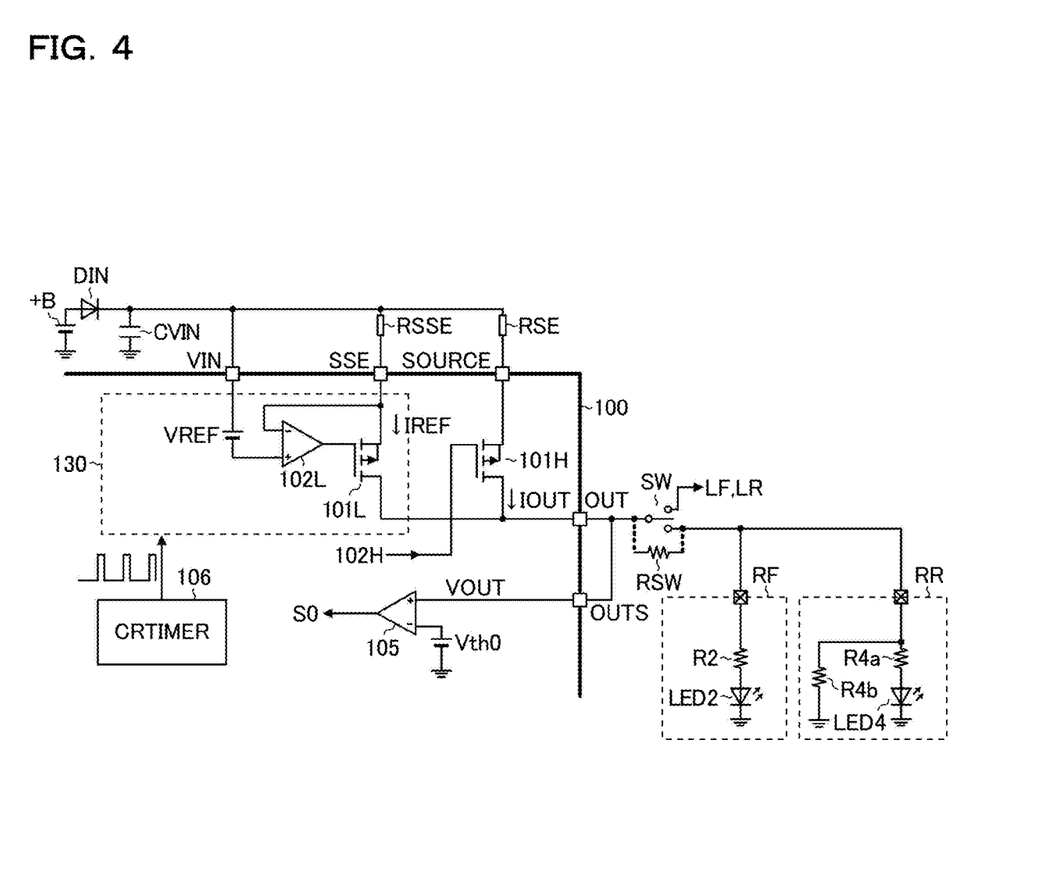
FIG. 4 is a diagram showing a configuration of a part (around a voltage sense circuit) of a light-emitting element driving device.

FIG. 4 is a diagram showing the configuration of a part (around the voltage sense circuit 105) of the light-emitting element driving device 100. The light-emitting element driving device 100 has, as basic operation modes, a flasher switch monitoring mode, a blinking H mode, and a blinking L mode. Now, with reference to FIG. 4, these operation modes will be described.

Flasher Switch Monitoring Mode

When the flasher switch SW is in the off state (open state) and the on/off control of the transistor 101H is being suspended, the light-emitting element driving device 100 is in the flasher switch monitoring mode (i.e., an operating state where it monitors the output voltage VOUT to detect the flasher switch SW turning on).

Specifically, the output voltage sense circuit 105 and the constant current source 130 are enabled when the on/off control of the transistor 101H is being suspended, so that the output voltage VOUT (=IREF×(RSW+R3b/R4b)) is monitored.

The switch resistance RSW in the above equation corresponds to the resistance component of the flasher switch SW (including the resistance component of the conductor pad) across which an off-leak current passes). That is, when the flasher switch SW is in the off state (open state), the switch resistance RSW is high. In contrast, when the flasher switch SW is in the on state (right blinking or left blinking state), the switch resistance RSW is low.

Moreover, in the constant current source 130, the drivers 102 control the gate of the transistor 101L such that the terminal voltage (=VIN−RSSE×IREF) at the SSE pin remains equal to a predetermined monitoring voltage (=VIN−VREF). As a result, through the OUT pin passes a constant current IREF (=VREF/RSSE) commensurate with the resistor RSSE.

The constant current IREF only needs to be high enough to produce a detectable voltage difference across the switch resistance RSW. Accordingly, from the viewpoint of power saving, the constant current IREF can be given a current value (e.g., 0.2 A) lower than the output current IOUT.

In the flasher switch monitoring mode described above, the logic circuit 120 starts the on/off control of the transistor 101H when a state where the output voltage VOUT is lower than an on-threshold value Vth0L (e.g., Vth0L=0.95V) lasts for a predetermined masking period (e.g., 8 clocks).

That is, on detecting a drop in the output voltage VOUT (a drop in the switch resistance RSW) resulting from the flasher switch SW turning on, the logic circuit 120 starts the on/off control of the transistor 101H. As a result, the light-emitting element driving device 100 shifts to a state where it repeats the blink mg H mode and the blink mg L mode alternately.

Blinking H Mode

With the light-emitting element driving device 100 having shifted from the flasher switch monitoring mode to the blinking H mode, the logic circuit 120 basically keeps the transistor 101H on for a predetermined on-period Ton (e.g., 256 clocks, approximately 350 ms), so that the output current IOUT is fed out via the OUT pin.

Meanwhile, the output voltage sense circuit 105 and the constant current source 130 are disabled. This is because, when the transistor 101H is on, irrespective of the switch state of the flasher switch SW, VOUT≈VIN all the lime, and thus it is impossible, by monitoring the output voltage VOUT, to determine the switch state of the flasher switch SW.

On the other hand, m the blinking H mode, the current sense circuit 110 is enabled, and the different kinds of protective operation (short-circuit and open detection for LEDs) are performed. Moreover, in the blinking H mode, open detection for the flasher switch SW through output current monitoring is also performed (details will be given later).

If the on-period Ton of the transistor 101H elapses without activation of any of short-circuit detection for LEDs, open detection for LEDs, or open detection for the flasher switch SW through output current monitoring, the light-emitting element driving device 100 shifts from the blinking H mode to the blinking L mode.

Blinking L Mode

With the light-emitting element driving device 100 having shifted from the blinking H mode to the blinking L mode, the logic circuit 120 basically keeps the transistor 101H off for a predetermined off-period Toff (e.g., 256 clocks, approximately 350 ms), so that the generation of the output current IOUT is suspended.

Meanwhile, the current sense circuit 110 is disabled. This is because, when the transistor 101H is off, the output current IOUT does not pass through the transistor 101H, and thus it is meaningless to monitor the sense voltage VSE appearing at the SE pin.

On tire other hand, in the blinking L mode, the output voltage sense circuit 105 and the constant current source 130 are enabled, and open detection for the flasher switch SW through output voltage monitoring is performed.

Specifically, in the blinking L mode described above, the logic circuit 120 suspends the on/off control of the transistor 101H when tire output voltage VOUT becomes higher than an off-threshold value Vth0H (e.g., Vth0H=1.0 V).

That is, on detecting a rise in the output voltage VOUT (i.e., a rise in the switch resistance RSW) resulting from the flasher switch SW turning on (turning open), the logic circuit 120 suspends the on/off control of the transistor 101H As a result, the light-emitting element driving device 100 shifts back to the flasher switch monitoring mode described previously.

If the off-period Toff of the transistor 101H elapses without activation of open detection for the flasher switch SW through output voltage monitoring, the light-emitting element driving device 100 shifts from the blinking L mode to the blinking H mode.

Blinking Control

Figure 5:
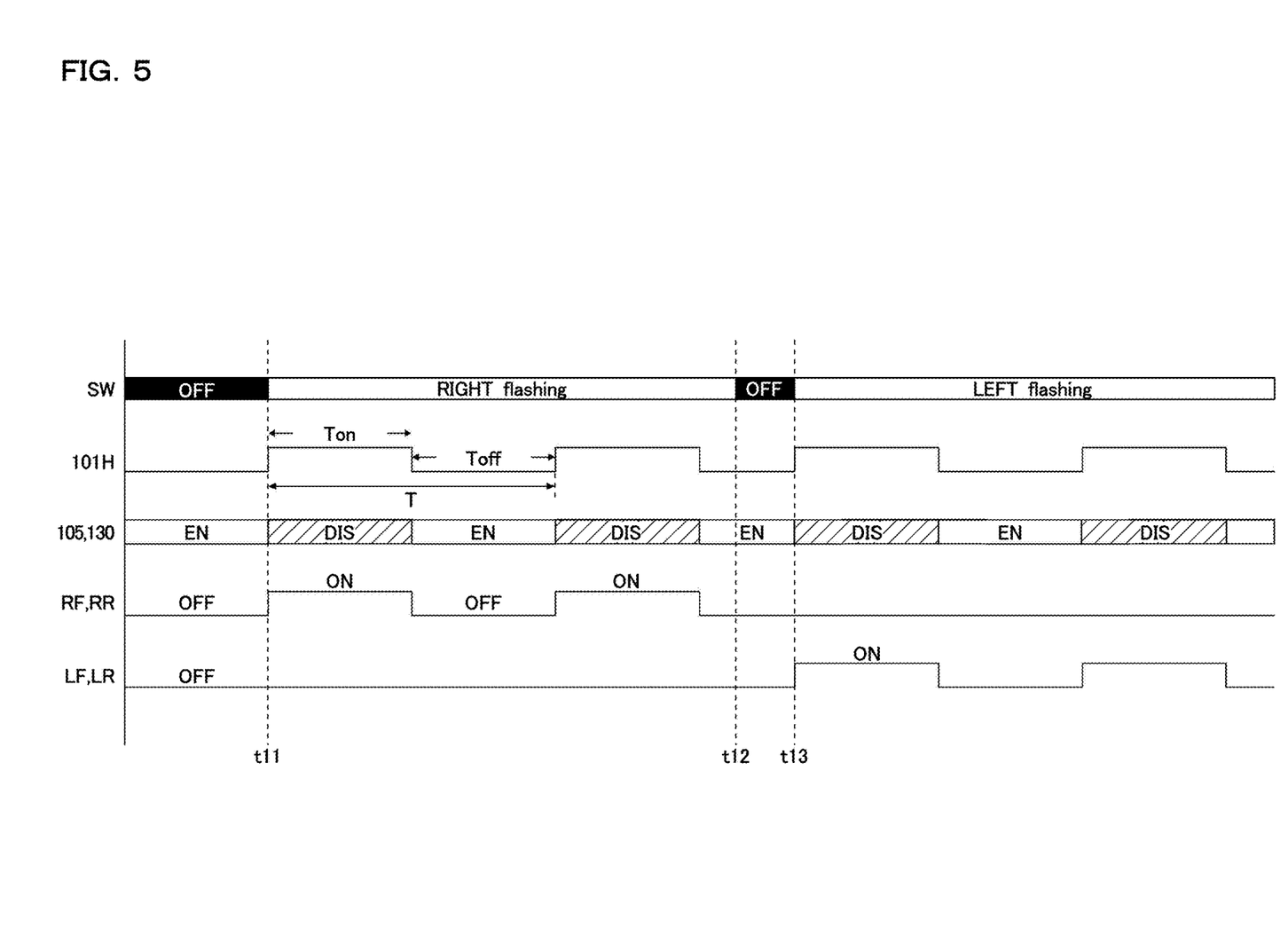
FIG. 5 is a diagram showing one example (basic operation) of blinking control.

FIG. 5 is a diagram showing one example (basic operation) of blinking control by the light-emitting element driving device 100, depicting, from top down, the switch state of the flasher switch SW, the on/off state of the transistor 101H, the operating states of the output voltage sense circuit 105 and the constant current source 130 (i.e., the monitoring state of the output voltage VOUT), the lit/extinguished states of the right flasher lamps RF and RR, and the lit/extinguished states of the left flasher lamps LF and LR.

Before time point t11, the flasher switch SW is in the off state (open state) and the on/off control of the transistor 101H is being suspended (i.e., the transistor 101H remains off). Accordingly, tire right flasher lamps RF and RR and the left flasher lamps LF and LR are all in the extinguished state.

In this state, the light-emitting element driving device 100 is in the flasher switch monitoring mode described previously. That is, the output voltage sense circuit 105 and the constant current source 130 are enabled (EN), and the monitoring of the output voltage VOUT (more specifically, turning-on detection for the flasher switch SW through output voltage monitoring) is performed.

At time point t11, when the flasher switch SW is switched from the off state to the right blinking state (on state), a drop m the output voltage VOUT is detected; thus, the on/off control of the transistor 101H is started. Specifically, the light-emitting element driving device 100 shifts to a state where it repeats the blinking H mode and the blinking L mode alternately at a predetermined blinking period T (=Ton+Toff). As a result, through the right flasher lamps RF and RR, the output current IOUT passes intermittently, and thus the right flasher lamps RF and RR are driven to blink. On the other hand, through the left flasher lamps LF and LR, the output current IOUT does not pass, and thus the left flasher lamps LF and LR are kept in the extinguished state.

As mentioned previously, the output voltage sense circuit 105 and the constant current source 130 are disabled (DIS) in the blinking H mode, and are enabled (EN) in the blinking L mode.

Then, at time point t12, during the off-period Toff of the transistor 101H, the flasher switch SW is switched from the right blinking state to the off state.

At that time, the light-emitting element driving device 100 is in the blinking L mode, and the output voltage sense circuit 105 and the constant current source 130 are enabled (EN). Accordingly, as the flasher switch SW turns off (turns open), a rise in tire output voltage VOUT is detected; thus the on off control of the transistor 101H is suspended, and the light-emitting element driving device 100 is switched back to the flasher switch monitoring mode described previously. Moreover, in tire logic circuit 120, the counter 121 in it is initialized, and the blinking period T is reset.

Thereafter, at time point t13, when the flasher switch SW is switched from the off state to the left blinking state, a drop in the output voltage VOUT is detected again, and thus the on/off control of the transistor 101H is started.

At that time, the blinking period T has already been reset. Accordingly, when a shift to the blinking H mode takes place, the count of the on-period Ton can be incremented starting with a zero value. In tins way, when the left flasher lamps LF and LR start being driven to blink, their initial lighting period is prevented from becoming indefinite.

As described above, when, with the light-emitting element driving device 100 in the blinking L mode, the flasher switch SW is switched to the off state (open state), the open detection function for the flasher switch SW through output voltage monitoring is active. This prevents a fault in the blinking control of the flasher lamps (i.e., an indefinite or lost initial lighting period).

However, when, with the light-emitting element driving device 100 in the blinking H mode, the flasher switch SW is switched to the off state (open state), the open detection function for the flasher switch SW through output voltage monitoring remains inactive. This can lead to a fault in the blinking control of the flasher lamps.

To cope with that, the light-emitting element driving device 100 is innovatively provided with, as a means for solving the above-mentioned problem, an open detection function for the flasher switch SW through output current monitoring (specifically, a comparator for SW open detection).

Before a description of the above-mentioned novel function (the SW open detection function through output current monitoring), a brief description will now be given of faults that can occur without the introduction of that novel function.

Figure 6:
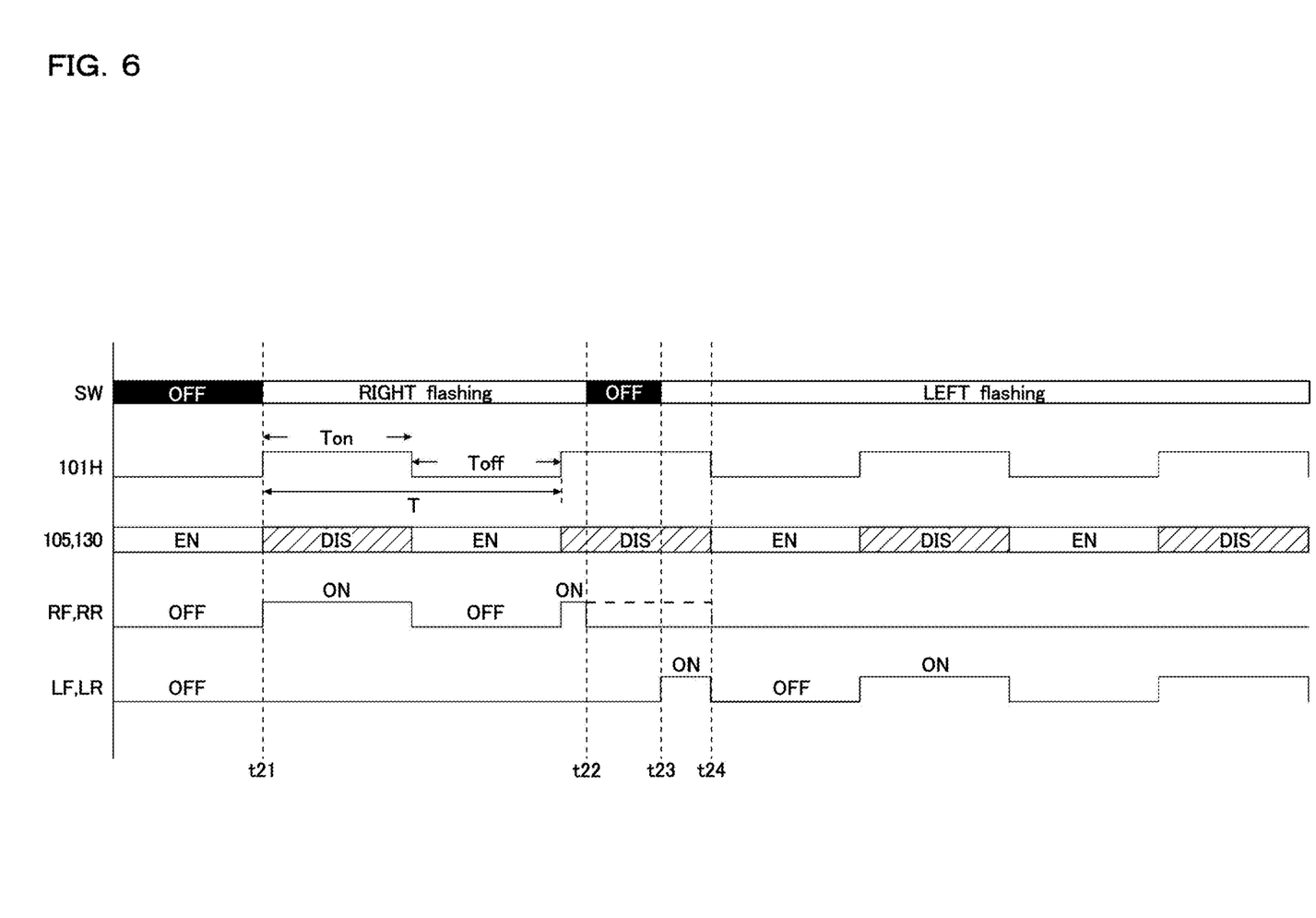
FIG. 6 is a diagram showing how a fault occurs in blinking control.
Figure 7:
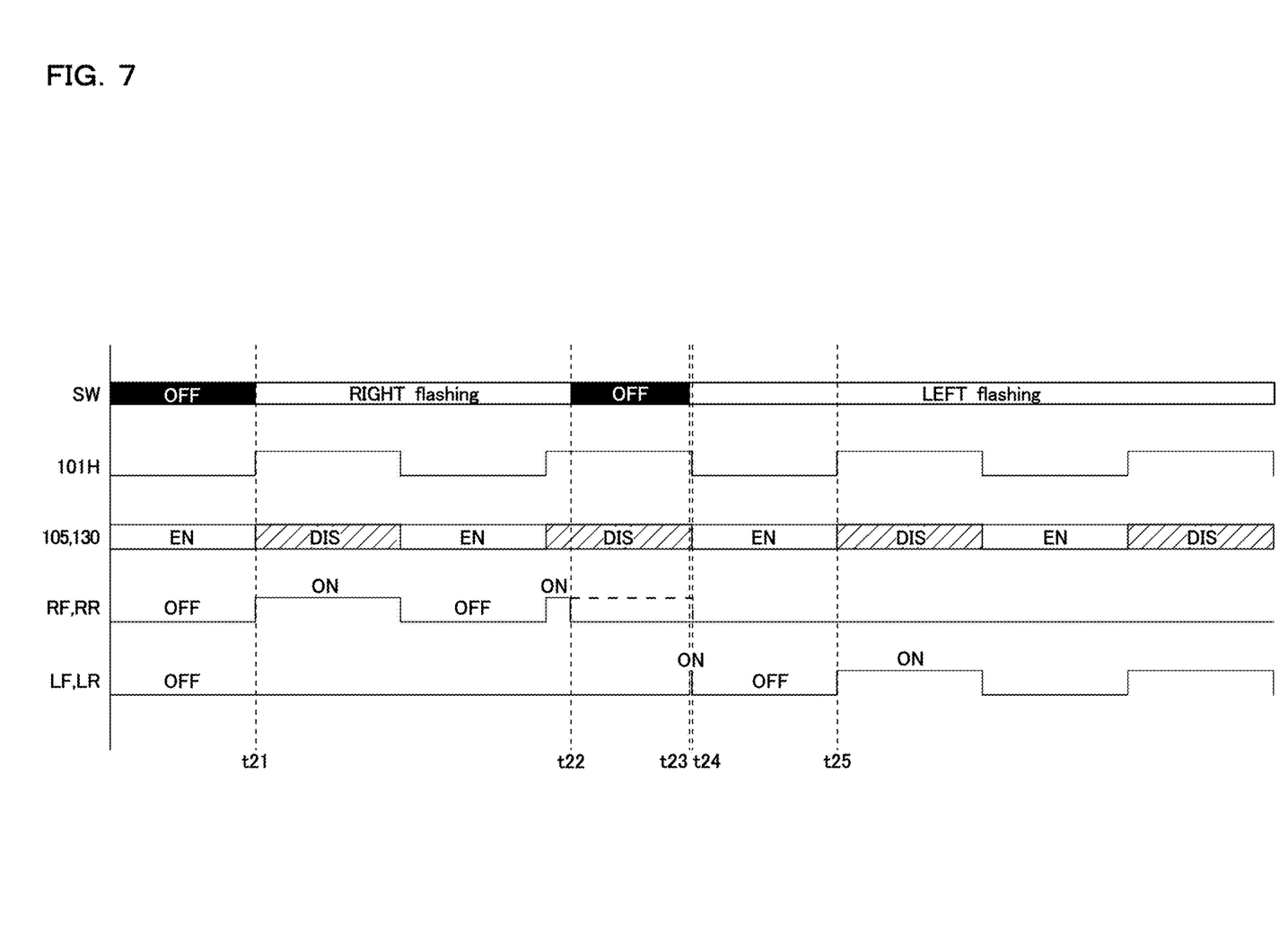
FIG. 7 is a diagram showing how a fault occurs in blinking control.

FIGS. 6 and 7 are diagrams each showing how a fault occurs in the blinking control by the light-emitting element driving device 100 if for the sake of discussion, the SW open detection function through output current monitoring is not introduced, each depicting, like FIG. 5 referred to previously, from top down, the switch state of the flasher switch SW, the on/off state of the transistor 101H, the operating stales of the output voltage sense circuit 105 and the constant current source 130 (i.e., the monitoring state of the output voltage VOUT), the lit/extinguished states of the right flasher lamps RF and RR, and the lit/extinguished states of the left flasher lamps LF and LR.

Before time point t21, the flasher switch SW is in the off state (open state) and the on/off control of the transistor 101H is being suspended. Accordingly, The right flasher lamps RF and RR and the left flasher lamps LF and LR are all in the extinguished state.

At that lime, the light-emitting element driving device 100 is in the flasher switch monitoring mode described previously. That is, the output voltage sense circuit 105 and the constant current source 130 are enabled (EN), and the monitoring of the output voltage VOUT (more specifically, turning-on detection for the flasher switch SW through output voltage monitoring) is performed.

At time point t21, when the flasher switch SW is switched from the off state to the right blinking state (on state), a drop in the output voltage VOUT is detected, and thus the on/off control of the transistor 101H is started. That is, the light-emitting element driving device 100 shifts to a state where it repeats the blinking H mode and the blinking L mode alternately at a predetermined blinking period T (=Ton+Toff). As a result, through the right Hasher lamps RF and RR, the output current IOUT passes intermittently, and thus the right flasher lamps RF and RR are driven to blink. On the other hand, through the left flasher lamps LF and LR, the output current IOUT does not pass, and thus the left flasher lamps LF and LR, are kept in the extinguished state.

As mentioned previously, the output voltage sense circuit 105 and the constant current source 130 are disabled (DIS) in the blinking H mode, and are enabled (EN) in the blinking L mode. The operation thus far is no different from what is shown in FIG. 5 referred to previously.

Then, at time point t22, during the on-period Ton of the transistor 101H, the flasher switch SW is switched from the right blinking state to the off state. As a result, the current supply path to the right flasher lamps RF and RR is cut off, and thus the right flasher lamps RF and RR go into the extinguished state.

At that time, the light-emitting element driving device 100 is in the blinking H mode, and the output voltage sense circuit 105 and the constant current source 130 are disabled (DIS). Accordingly, the SW open detection function through output voltage monitoring is inactive; thus even after time point t22, the blinking period T is not reset, and the on-period Ton of the transistor 101H persists. That is, at time point t22, unlike at lime point t12 in FIG. 5, no return is made from the blinking H mode to the flasher switch monitoring mode.

Thereafter, at time point t23, when the flasher switch SW is switched from the off state to the left blinking state, the current supply path to the left flasher lamps LF and LR conducts; thus, the left flasher lamps LF and LR comes into the lit state. Even at this time point, the blinking period T (i.e., the count of the on-period Toni is not reset.

Then, at lime point t24, when the on-period Ton, which has been counted without being reset until then, expires, the transistor 101H switches to the off state.

As described above, if, at the time point that the left flasher lamps LF and LR start to be driven to blink, the persisting on-period Ton has not been reset, the initial lighting period of the left flasher lamps LF and LR can be shorter than it is supposed to be and indefinite (i.e., between time points t23 and t24). This may violate pertinent laws if, with respect to the blinking driving of Hasher lamps, a minimum lighting period is prescribed in them.

As shown in FIG. 7, if the Hasher switch SW is switched to the left blinking state immediately before the counting of the on-period Ton expires, the initial lighting period (i.e., between time points t23 and t24) of the left Hasher lamps LF and LR becomes extremely short.

As a result, while the human eye cannot recognize the above initial lighting period, the transistor 101H shifts to the off-period Toff. In that case, it is apparently so recognized that, only at the time point (i.e., time point 125) that the transistor 101H shifts back to tire on-period Ton (blinking H mode) are the left Hasher lamps LF and LR barely lit. In other words, the left flasher lamps LF and LR appear to have started to blink with a delay.

The time permitted after the flasher switch SW is turned on until the flasher lamps start to blink is prescribed in laws (e.g., within 0.15 s). Thus, a delay of flasher lamps in starting to blink may violate such laws.

SW Open Detection Function Through Output Current Monitoring.

Now, a detailed description will be given of the novel function (the SW open detection function through output current monitoring) introduced as a means for solving the above-mentioned fault in the light-emitting element driving device 100.

Figure 8:
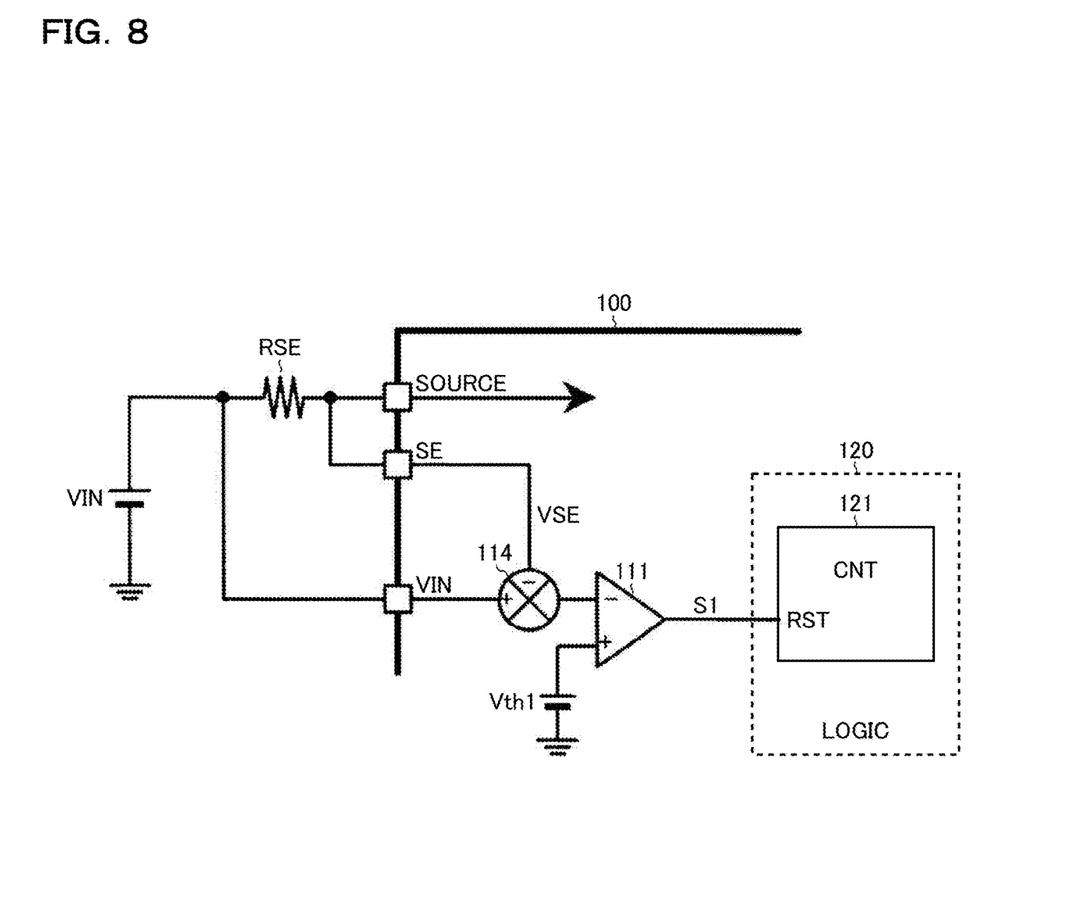
FIG. 8 is a diagram showing a configuration of a part (around a current sense circuit) of a light-emitting element driving device.

FIG. 8 is a diagram showing the configuration of a part (around the current sense circuit 110) of the light-emitting element driving device 100. As mentioned previously, the current sense circuit 110 includes a comparator 111 for SW open detection through output current monitoring.

FIG. 3 referred to previously shows air example where the threshold voltage (VIN−Vth1) and the sense voltage VSE are compared with each other by the comparator 111. Instead, a configuration is also possible where, as shown in FIG. 8, a subtractor 114 that generates a differential voltage (VIN−VSE) between the input voltage VIN and the sense voltage VSE and this differential voltage (VIN−VSE) and the threshold voltage Vth1 are compared with each other by the comparator 111.

Irrespective of which of the configurations is adopted, the comparison signal S1 generated by the comparator 111 is at high level (i.e., the logic level indicating an SW open being detected) when IOUT<Ith1 (=Vth1/RSE), and is at low level (i.e., the logic level indicating no SW open being detected) when IOUT>Ith1.

Based on the above-mentioned comparison signal S1, the logic circuit 120 control the resetting of the counter 121. Specifically, when, during the on-period Ton of the transistor 101H, the flasher switch SW turns off (turns open) and consequently a drop in the output current IOUT causes the comparison signal S1 to rise to high level, the logic circuit 120 suspends the on/off control of the transistor 101H, and also initializes the counter 121 to reset the blinking period T.

Figure 9:
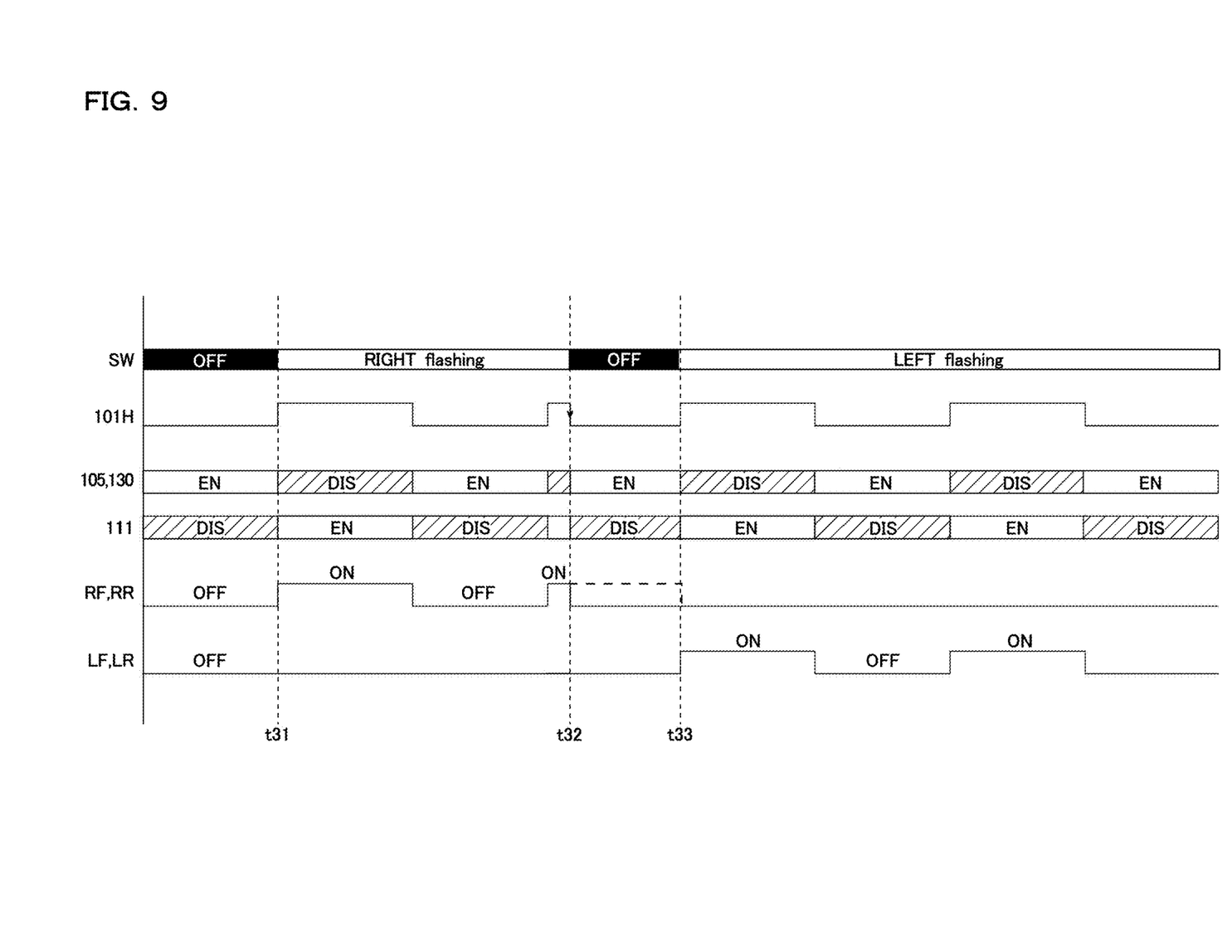
FIG. 9 is a diagram showing how a fault in blinking control is eliminated.

FIG. 9 is a diagram showing how a fault m the blinking control by the light-emitting element driving device 100 is eliminated by the novel introduction of the SW open detection function through output current monitoring, depicting, from top down, the switch state of the flasher switch SW, the on/off state of the transistor 101H, the operating states of the output voltage sense circuit 105 and the constant current source 130 (i.e., tire monitoring state of the output voltage VOUT), the operating state of the current sense circuit 110 (i.e., the monitoring state of the output current IOUT), the lit/extinguished states of the right flasher lamps RF and RR, and the lit/extinguished states of the left flasher lamps LF and LR.

Before time point t31, the flasher switch SW is in the off state (open state), and the on/off control of the transistor 101H is being suspended (i.e., the transistor 101H remains off). Accordingly, the right flasher lamps RF and RR and the left flasher lamps LF and LR are all in tire extinguished state.

At that time, the light-emitting element driving device 100 is in the flasher switch monitoring mode described previously. That is, the output voltage sense circuit 105 and the constant current source 130 are enabled (EN), and the monitoring of the output voltage VOUT (more specifically, turning-on detection for the flasher switch SW through output voltage monitoring) is performed. On the other hand, the current sense circuit 110 is disabled (DIS), and thus the monitoring of the output current TOUT is not performed.

At time point t31, when the flasher switch SW is switched from the off state to tire right blinking state (open state), a drop in the output voltage VOUT is detected, and thus the on/off control of the transistor 101H is started That is, the light-emitting element driving device 100 shifts to a state where it repeats the blinking H mode and the blinking L mode alternately at a predetermined blinking period T (=Ton+Toff). As a result, through the right flasher lamps RF and RR, the output current IOUT passes intermittently, and thus the right flasher lamps RF and RR are driven to blink. On the other band, through the left flasher lamps LF and LR, the output current IOUT does not pass, and thus the left flasher lamps LF and LR are kept m the extinguished state.

As mentioned previously, the output voltage sense circuit 105 and the constant current source 130 are disabled (DIS) in the blinking H mode, and are enabled (EN) in the blinking L mode. Complementarity, the current sense circuit 110 is enabled (EN) in the blinking H mode, and is disabled (DIS) in the blinking H mode.

Then, at lime point t32, during the on-period Ton of the transistor 101H, the flasher switch SW is switched from the right blinking state to the off state. As a result, the current supply path to the right flasher lamps RF and RR is cut off, and thus the right flasher lamps RF and RR go into the extinguished state.

At that time, the light-emitting element driving device 100 is in the blinking H mode, and the current sense circuit 110 is enabled (EN). Accordingly, when the flasher switch SW turns on (turns open), a drop in the output current IOUT (a larger drop in the current than on occurrence of an LED open) is detected; thus the on/off control of the transistor 101H is suspended, and the light-emitting element driving device 100 is shifted back to the flasher switch monitoring mode described previously. Moreover, in the logic circuit 120, the counter 121 in it is initialized, mid the blinking period T is reset.

Thereafter, at time point t33, when the flasher switch SW is switched from the off state to the left blinking state, a drop in the output voltage VOUT is detected again, and thus the on/off control of the transistor 101H is started.

At that time, the blinking period T has already been reset. Accordingly, when a shift to the blinking H mode takes place, the count of the on-period Ton can be incremented starting with a zero value. In tins way, when the left flasher lamps LF and LR start being driven to blink, their initial lighting period is prevented from becoming indefinite.

As described above, owing to the novel introduction of the SW open detection function through output current monitoring, even when the flasher switch SW is switched to the off state (open state) with the light-emitting element driving device 100 in the blinking H mode, no fault (i.e., nothing like an indefinite or lost initial lighting period) occurs in the blinking control of the flasher lamps.

MODIFIED EXAMPLES

The above embodiment deals with an example where the flasher switch SW is switched from the right blinking state to the off state (open state) and then to the left blinking state. Needless to say, also when the flasher switch SW is switched in the reversed sequence, that is, from the left blinking state to the off state (open state) and then to the right blinking state, no fault occurs in the blinking control of the flasher lamps. The same applies also when the flasher switch SW is switched from the right blinking state to the off state (open state) and then to the right blinking state, or from the left blinking state to the off state (open state) and then to the left blinking state.

Vehicle (Motorcycle)

Figure 10:
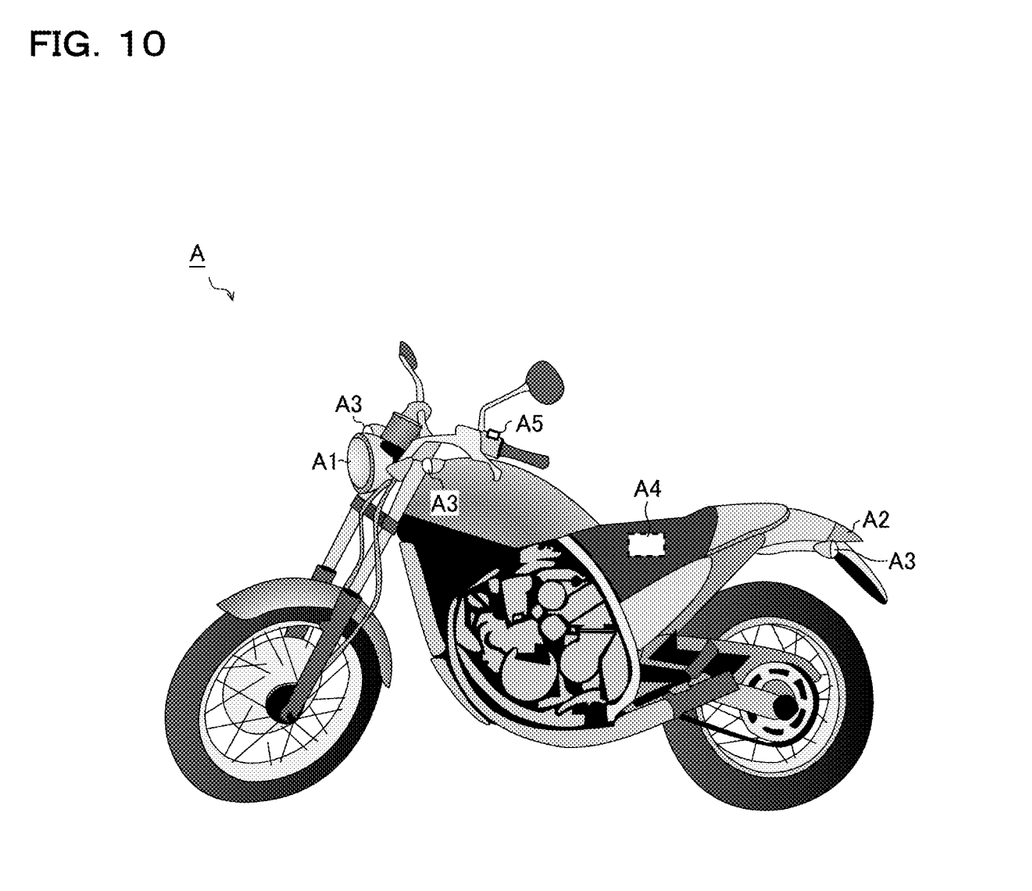
FIG. 10 is a diagram showing an exterior appearance of a motorcycle.

FIG. 10 is a diagram showing the exterior appearance of a motorcycle. The motorcycle A shown there is what is generally called a mid-size motorcycle (i.e., corresponding to a general-purpose two-wheeled automobile classified into a vehicle category with engine displacements over 50 cc up to 400 cc in Japan's Road Traffic Act). The motorcycle A is provided with LED lamps A1 to A3 (more specifically, fin LED headlight A1, an LED taillght A2, and LED flasher lamps (turn indicator lights or turn signals) A3), a battery A4 that serves as a power source for them, and a flasher switch A5 that switches the driving state of the LED flasher lamps A3.

It should be understood that, for the sake of convenience of illustration, the LED lamps A1 to A3, the battery A4, and the flasher switch A5 are in FIG. 10 shown to be located at places that may be different from where they actually are.

The left flasher lamps LF and LR and the right flasher lamps RF and RR mentioned previously correspond to the LED flasher lamps A3 in FIG. 10. The battery +B mentioned previously corresponds to the battery A4 in FIG. 10. The flasher switch SW mentioned previously corresponds to the flasher switch A5 in FIG. 10.

As described above, the light emission system (described previously can be mounted on a motorcycle A (or any other type of vehicle) as a means for controlling the blinking of LED flasher lamps A3.

Overview

To follow is an overview of the various embodiments disclosed herein.

For example, according to one aspect of what is disclosed herein, a driving device includes, an output terminal; a transistor configured to generate an output current to the output terminal; a logic circuit configured to perform on/off control of the transistor at a predetermined period, and a current sense circuit configured to sense the output current. The current sense circuit is configured to be enabled during an on-period of the transistor, and the logic circuit is configured to suspend the on/off control and reset the period when the output current becomes lower than a first threshold value during the on-period. (A first configuration.)

The driving device of the first configuration described above can further include: a constant current source configured to generate a constant current to the output terminal; and a voltage sense circuit configured to sense the output voltage appearing at the output terminal. The constant current source and the voltage sense circuit can be configured to be enabled during the off-period of the transistor. The logic circuit can be configured to suspend the on/off control and reset the period when the output voltage becomes higher than an off-threshold value during the off-period (A second configuration.)

In the driving device of the second configuration described above, the constant current source and the voltage sense circuit can be configured to be enabled also when the on/off control is being suspended. The logic circuit can be configured to start the on/off control when the output voltage appearing when the on/off control is being suspended becomes lower than an on-threshold value (A third configuration.)

In the driving device of the second or third configuration described above, tire constant current can be lower than the output current. (A fourth configuration.)

In the driving device of any of the first to fourth configurations described above, the logic circuit can be configured to forcibly turn off the transistor when the output current becomes higher than a second threshold value during the on-period. (A fifth configuration.)

In the driving device of any of the first to fifth configurations described above, the logic circuit can be configured to shorten the period when the output current becomes lower than a third threshold value during the on-period. (A sixth configuration.)

For example, according to another aspect of what is disclosed herein, a light emission system includes: the driving device of any of the first to sixth configurations described above; and a switch and at least one light-emitting element connected in series to the output terminal of the driving device. (A seventh configuration.)

In the light emission system of the seventh configuration described above, the switch can be a conduction path for an off-leak current. (An eighth configuration.)

For example, according to yet another aspect of what is disclosed herein, a vehicle includes: the fight emission system according to the seventh or eighth configuration described above. The at least one light-emitting element can each constitute either a left Hasher lamp or a right flasher lamp. (A ninth configuration.)

In tire vehicle of the ninth configuration described above, the switch can take one of the following three states: a first state where the switch keeps the path between the output terminal and the left flasher lamp conducting and keeps the path between the output terminal and the right flasher lamp cut off; a second state where the switch keeps the path between the output terminal and the right flasher lamp conducting and keeps the path between the output terminal and the left flasher lamp cut off; and a third state where the switch the switch keeps both the path between the output terminal and the left flasher lamp and the path between the output terminal and the right flasher lamp cut off. Here, switching from the first state to the second state and switching from the second state to the first state can proceed by going through the third state midway. (A tenth configuration.)

Further Modifications

The various technical features disclosed herein can be implemented in any manner other than specifically described by way of embodiments above, and allow for many modifications within the spirit of the technical ingenuity involved. For example, the target of a driving device is not limited to light-emitting elements. For another example, where to install a driving device is not limited to on vehicles. That is, it should be understood that the embodiments disclosed herein are in every aspect illustrative and not restrictive, and that the technical scope of the present invention is defined not by the description of embodiments given above but by the scope of the appended claims and encompasses any modifications in a sense and scope equivalent to those of the claims.

INDUSTRIAL APPLICABILITY

The invention disclosed herein finds applications in, for example, LED driver ICs for driving the blinking of LED flasher lamps on motorcycles.

What is claimed is:

1. A driving device comprising:
   an output terminal;
   a transistor configured to generate an output current to the output terminal;
   a logic circuit configured to perform on/off control of the transistor at a predetermined period; and
   a current sense circuit configured to sense the output current,
   wherein
   the current sense circuit is configured to be enabled during an on-period of the transistor, and
   the logic circuit is configured to suspend the on/off control and reset the period, when the current sense circuit detects that the output current becomes lower than a first threshold value during the on-period.

2. The driving device according to claim 1, further comprising:
   a constant current source configured to generate a constant current to the output terminal; and
   a voltage sense circuit configured to sense an output voltage appearing at the output terminal,
   wherein
   the constant current source and the voltage sense circuit are configured to be enabled during an off-period of the transistor, and
   the logic circuit is configured to suspend the on/off control and reset the period when the output voltage becomes higher than an off-threshold value during the off-period.

3. The driving device according to claim 2, wherein
   the constant current source and the voltage sense circuit are configured to be enabled also when the on/off control is being suspended, and
   the logic circuit is configured to start the on/off control when the output voltage appearing when the on/off control is being suspended becomes lower than an on-threshold value.

4. The driving device according to claim 2, wherein the constant current is lower than the output current.

5. The driving device according to claim 1, wherein the logic circuit is configured to forcibly turn off the transistor when the output current becomes higher than a second threshold value during the on-period.

6. The driving device according to claim 1, wherein the logic circuit is configured to shorten the period when the output current becomes lower than a third threshold value during the on-period.

7. A light emission system comprising:
   the driving device according to claim 1; and
   a switch and at least one light-emitting element connected in series to the output terminal of the driving device.

8. The light emission system according to claim 7, wherein the switch has a conduction path for an off-leak current.

9. A vehicle comprising:
   the light emission system according to claim 7, wherein the at least one light-emitting element each constitutes either a left flasher lamp or a right flasher lamp.

10. The vehicle according to claim 9, wherein
    the switch can take one of
    a first state where the switch keeps a path between the output terminal and the left flasher lamp conducting and keeps a path between the output terminal and the right flasher lamp cut off,
    a second state where the switch keeps the path between the output terminal and the right flasher lamp conducting and keeps the path between the output terminal and the left flasher lamp cut off, or
    a third state where the switch the switch keeps both the path between the output terminal and the left flasher lamp and the path between the output terminal and the right flasher lamp cut off, and
    switching from the first state to the second state and switching from the second state to the first state proceed by going through the third state midway.

* * * * *